(12) United States Patent
Maes et al.

(10) Patent No.: US 12,168,335 B2
(45) Date of Patent: Dec. 17, 2024

(54) WINDOW PANE AND METHOD FOR ITS PRODUCTION

(71) Applicants: ISOCLIMA S.p.A., Este Padua (IT); Lode Maes, Dottignies (BE)

(72) Inventors: Lode Maes, Dottignies (BE); Daniele Santi, Stra Venice (IT)

(73) Assignees: ISOCLIMA S.P.A., Este Padova (IT); Lode MAES, Dottignies (BE)

( * ) Notice: Subject to any disclaimer, the term of this patent is extended or adjusted under 35 U.S.C. 154(b) by 0 days.

(21) Appl. No.: 17/773,699

(22) PCT Filed: Oct. 27, 2020

(86) PCT No.: PCT/EP2020/025476
§ 371 (c)(1),
(2) Date: May 2, 2022

(87) PCT Pub. No.: WO2021/083549
PCT Pub. Date: May 6, 2021

(65) Prior Publication Data
US 2022/0379585 A1    Dec. 1, 2022

(30) Foreign Application Priority Data
Oct. 30, 2019   (EP) ..................................... 19425076

(51) Int. Cl.
*B32B 17/10* (2006.01)
*B32B 3/26* (2006.01)
(Continued)

(52) U.S. Cl.
CPC ........ *B32B 17/10917* (2013.01); *B32B 3/266* (2013.01); *B32B 7/12* (2013.01);
(Continued)

(58) Field of Classification Search
CPC ........ B32B 17/10917; B32B 17/10036; B32B 17/10761; B32B 17/10935;
(Continued)

(56) References Cited

U.S. PATENT DOCUMENTS

| 5,980,666 A | 11/1999 | Roth et al. |
| 6,129,974 A | 10/2000 | Woell |

(Continued)

FOREIGN PATENT DOCUMENTS

| DE | 4418074 A1 | 7/1995 |
| DE | 69826614 T2 | 2/2006 |

(Continued)

OTHER PUBLICATIONS

International Search Report and Written Opinion in Corresponding International Application No. PCT/EP2020/025476, mailed Dec. 7, 2020; 14 pgs.

*Primary Examiner* — Megha M Gaitonde
(74) *Attorney, Agent, or Firm* — HAUPTMAN HAM, LLP

(57) ABSTRACT

A window pane for a motor vehicle has a first pane and a second pane arranged parallel to the first pane, at least one intermediate adhesive layer arranged between the first and second panes for forming a laminate therewith, wherein the intermediate adhesive layer comprises at least one layer opening or recess which is surrounded by an inside opening wall of the intermediate adhesive layer, and a reinforcing adhesive material provided in the layer opening of the intermediate adhesive layer which shows a higher strength or hardness than the intermediate adhesive layer wherein the reinforcing adhesive material is coplanar to the intermediate adhesive layer.

13 Claims, 5 Drawing Sheets

(51) Int. Cl.
*B32B 7/12* (2006.01)
*B32B 27/30* (2006.01)
*B32B 37/12* (2006.01)
*B32B 37/18* (2006.01)
*B32B 38/10* (2006.01)

(52) U.S. Cl.
CPC .. *B32B 17/10036* (2013.01); *B32B 17/10761* (2013.01); *B32B 17/10935* (2013.01); *B32B 27/30* (2013.01); *B32B 37/1284* (2013.01); *B32B 37/182* (2013.01); *B32B 38/10* (2013.01); *B32B 2250/03* (2013.01); *B32B 2250/40* (2013.01); *B32B 2305/72* (2013.01); *B32B 2307/412* (2013.01); *B32B 2307/536* (2013.01); *B32B 2315/08* (2013.01); *B32B 2329/06* (2013.01); *B32B 2605/006* (2013.01)

(58) Field of Classification Search
CPC ........ B32B 17/10293; B32B 17/10743; B32B 17/1077; B32B 17/10788; B32B 3/266; B32B 3/30; B32B 7/12; B32B 27/30; B32B 37/1284; B32B 37/182; B32B 38/10; B32B 2250/03; B32B 2250/40; B32B 2305/72; B32B 2307/412; B32B 2307/536; B32B 2315/08; B32B 2329/06; B32B 2605/006; Y10T 428/24174; Y10T 428/24273–24347; Y10T 428/24479; Y10T 428/24612; Y10T 428/24942; Y10T 428/2495; Y10T 428/24959
USPC ........ 428/119, 131–140, 156, 172, 212, 213, 428/214

See application file for complete search history.

(56) References Cited

U.S. PATENT DOCUMENTS

| | | | |
|---|---|---|---|
| 6,261,672 | B1 | 7/2001 | De Paoli |
| 2004/0067343 | A1 | 4/2004 | Beteille et al. |
| 2007/0051452 | A1 | 3/2007 | Ward et al. |

FOREIGN PATENT DOCUMENTS

| | | |
|---|---|---|
| DE | 102012222056 A1 | 6/2014 |
| DE | 102015001350 A1 | 8/2016 |
| DE | 102016012837 A1 | 5/2018 |
| EP | 0555991 A2 * | 8/1993 |
| EP | 0922565 B1 | 9/2004 |
| EP | 2955064 A1 | 12/2015 |
| EP | 3315304 A1 | 5/2018 |
| WO | 2005040537 A1 | 5/2005 |
| WO | 2019180651 A1 | 9/2019 |
| WO | 2019186513 A1 | 10/2019 |

* cited by examiner

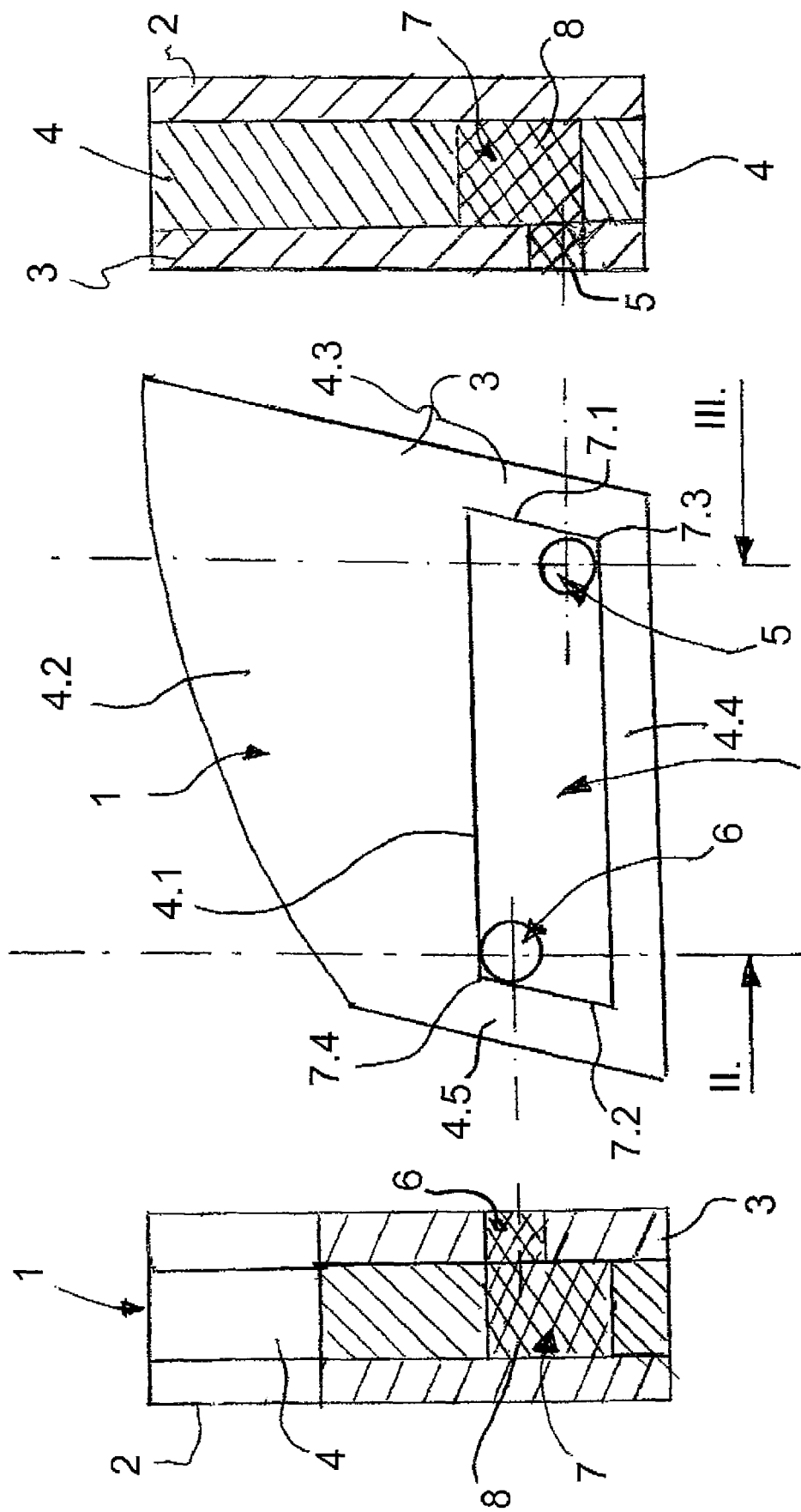

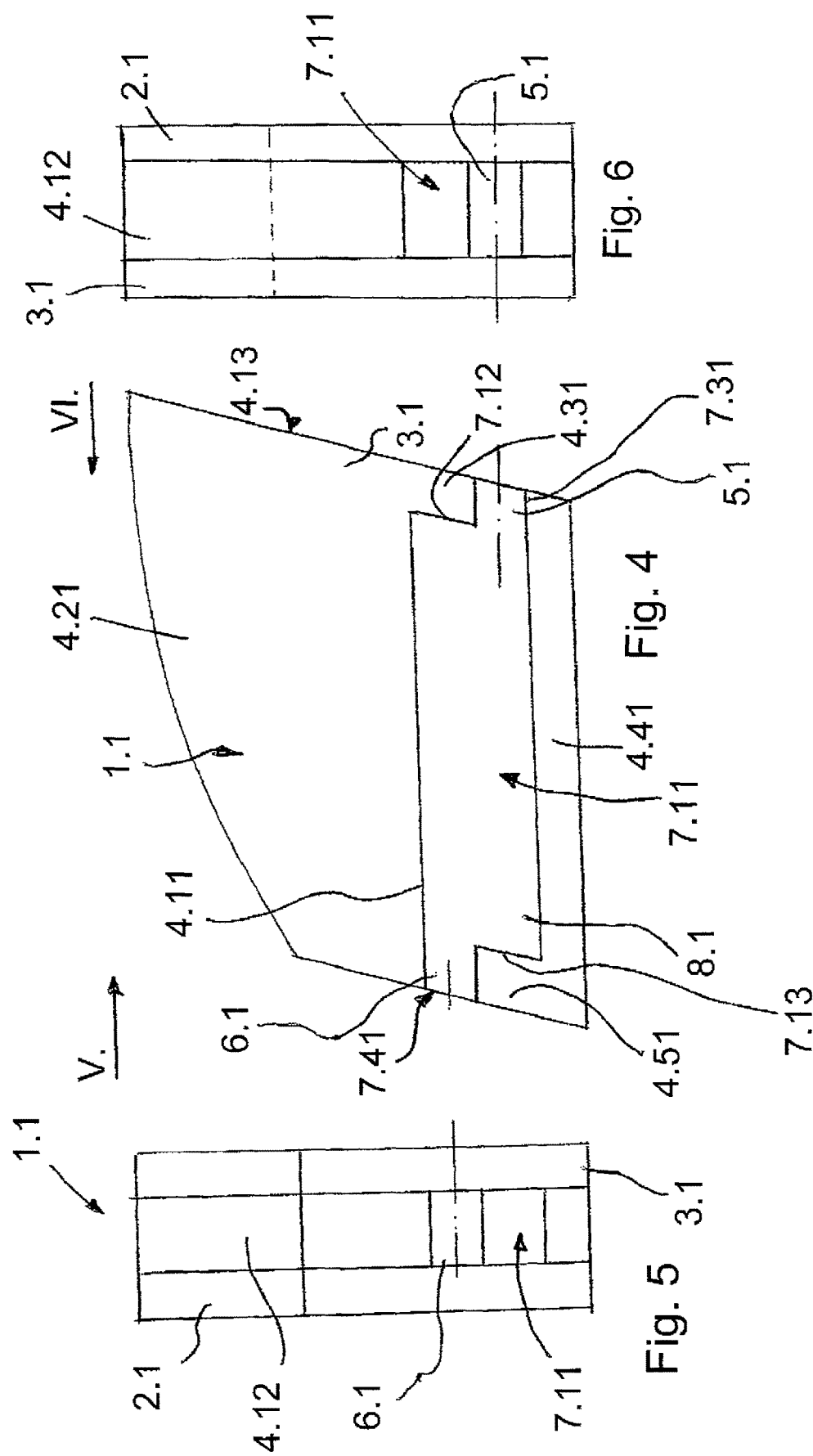

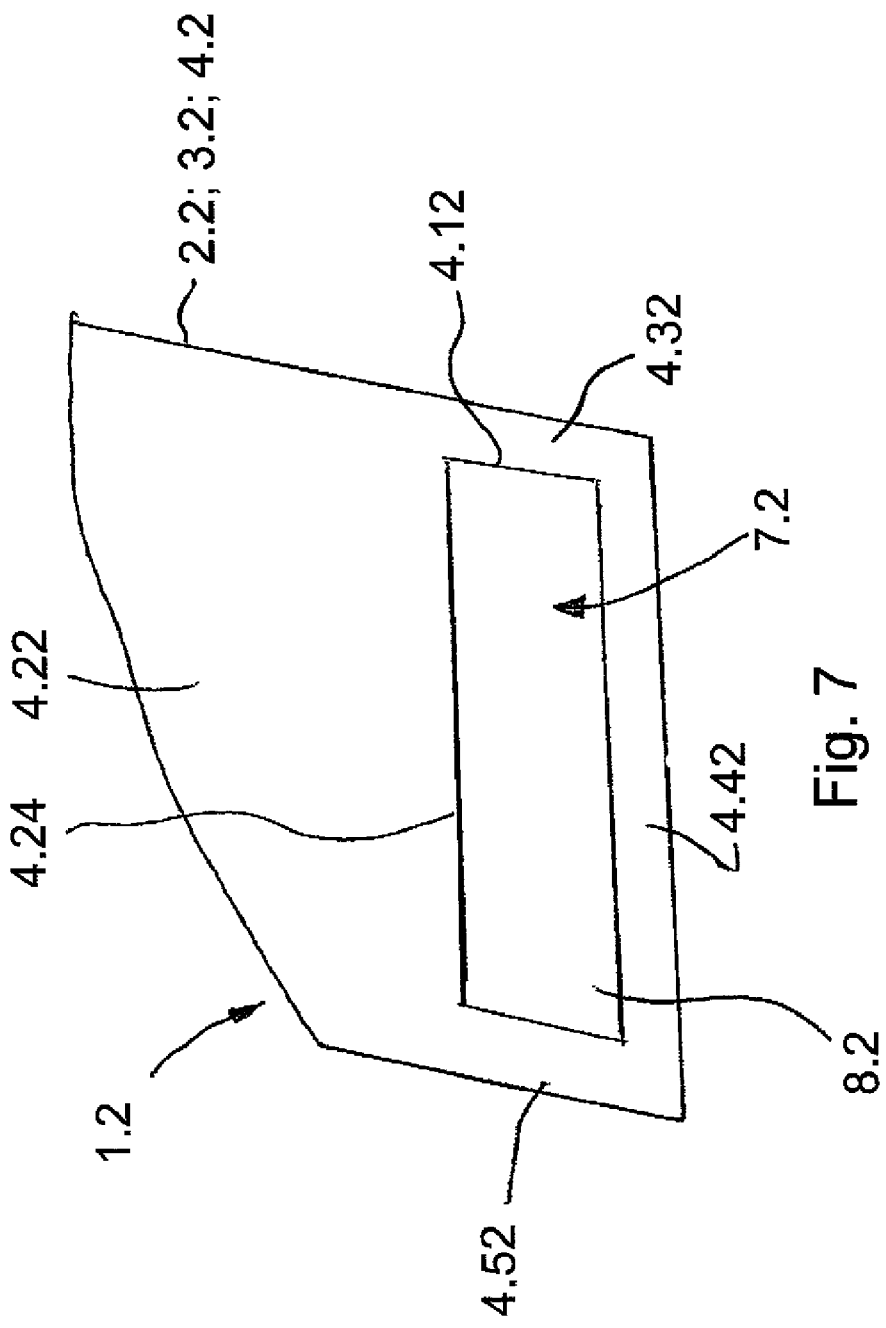

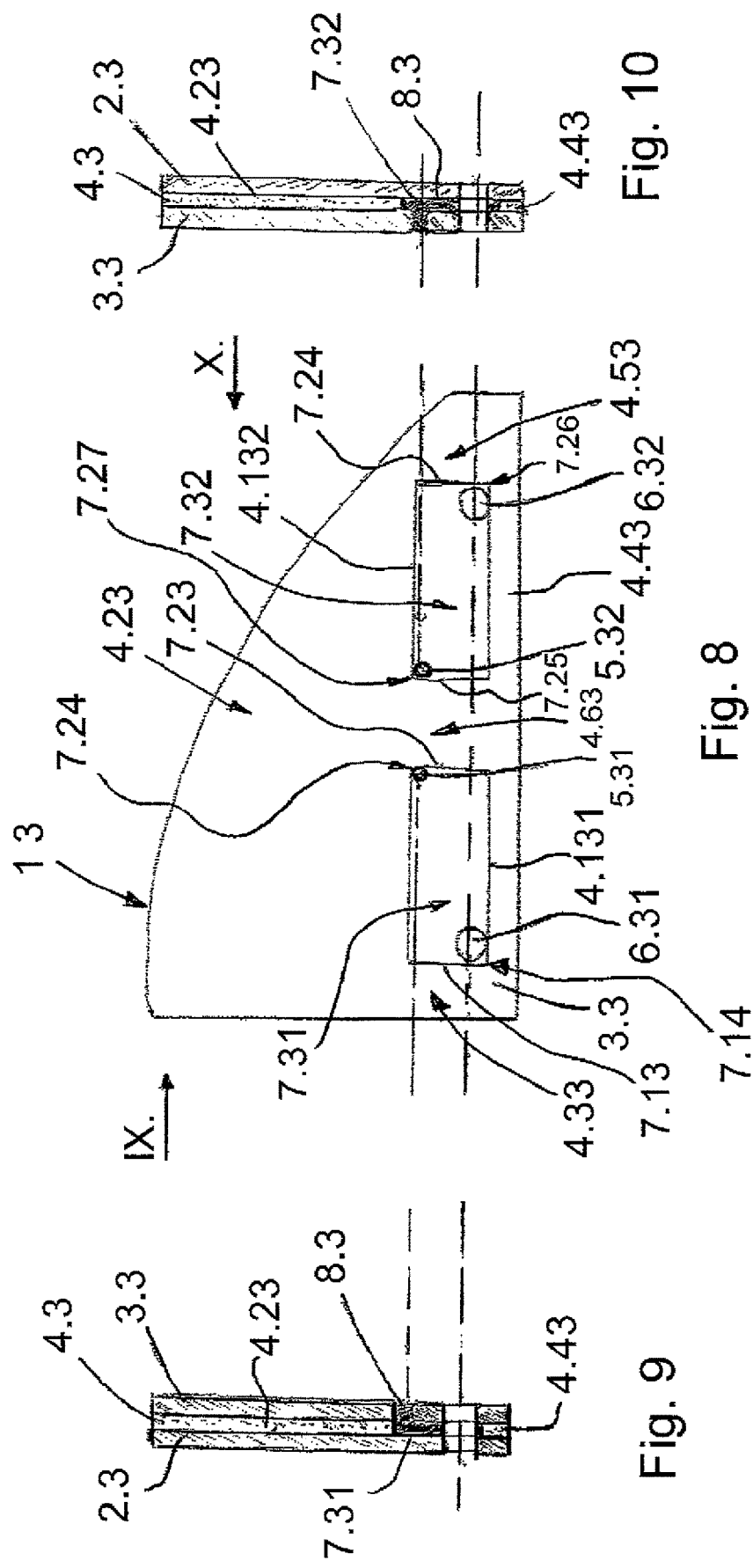

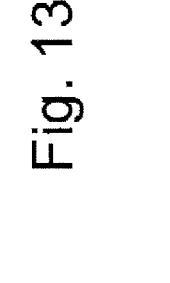
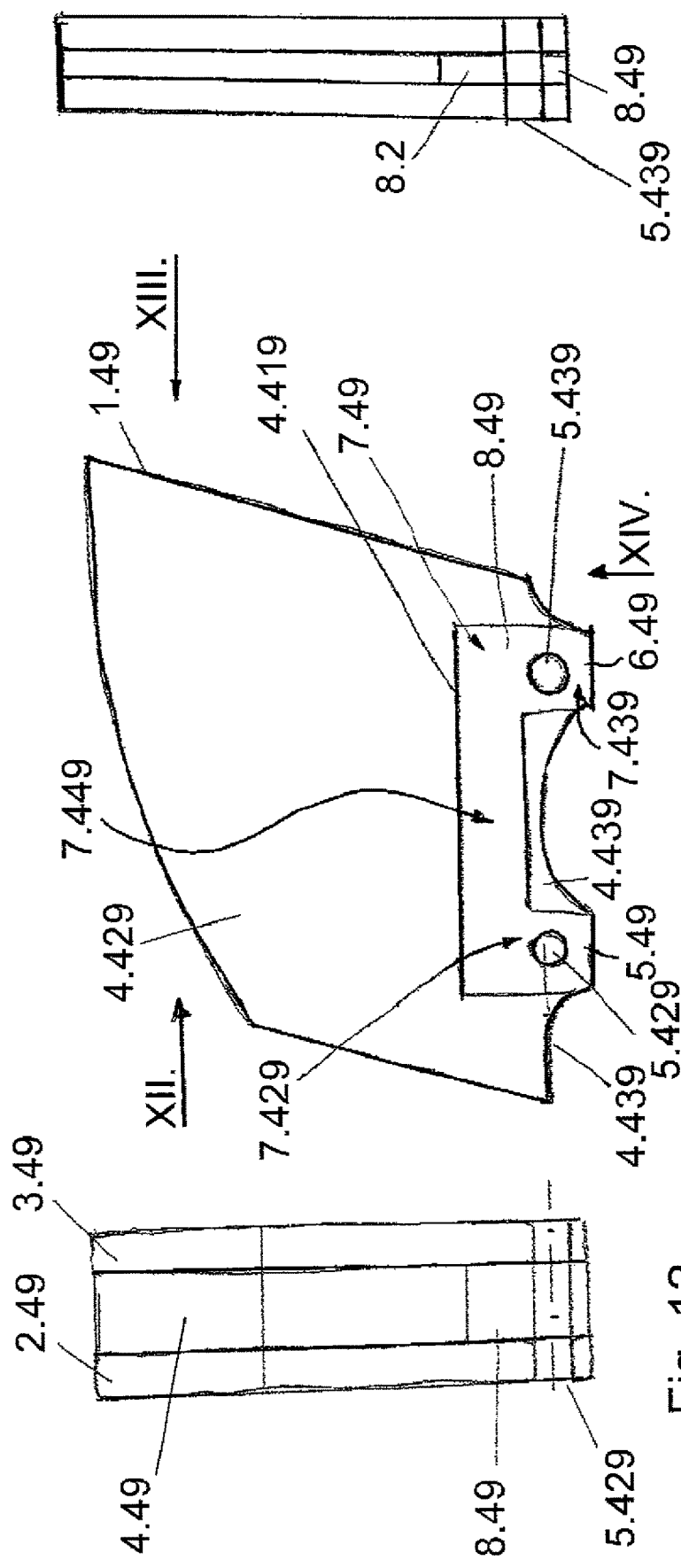
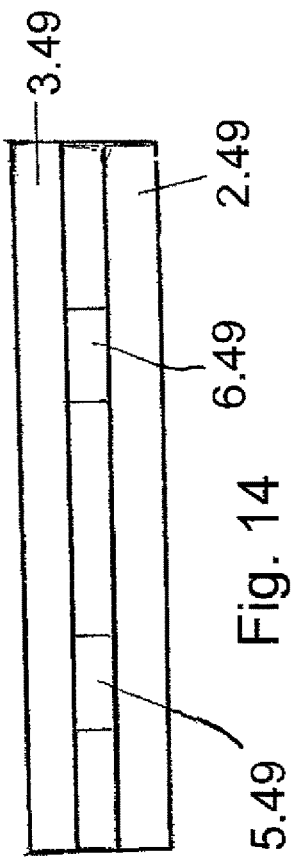

WINDOW PANE AND METHOD FOR ITS PRODUCTION

RELATED APPLICATIONS

The present application is a U.S. National Phase of International Application Number PCT/EP2020/025476 filed Oct. 27, 2020 and claims priority to European Application Number 19425076.7 filed Oct. 30, 2019.

The present invention refers to a window pane and to a method for the production of the window pane.

Glass panes or windows, in general, can be subjected to high forces generated by suction power, for example in a driving car, or by wind power in general. When the glass or window is exposed to external wind or suction power it can be twisted. In case of movable glass, for instance, a moveable side window of a car, this twist or distortion can block the movement of the glass.

This distortion phenomenon is explicit for laminated glass like laminated safety glass (VSG=Verbundsicherheitsglas). Laminated glass is a glass that consists of minimum three layers, one outer glass, one inner glass and in between minimum one layer of an adhesive like, for instance, a Polyvinylbutyral (PVB) foil. The reason for this distortion results mainly from the flexibility of the adhesive foil or layer. Once the part is laminated the adhesive is getting weak. Because of the weakness of the adhesive or PVB-foil the outer glass and inner glass can separately move from each other. This flexibility effect will increase when more adhesive layers will be combined or the thickness of the adhesive layers increase. For example an inner glass and an outer glass within between combined layers of an acoustic performance PVB together with a solar control PVB.

It is, therefore, an object of the invention to reduce the distortion in a window pane or laminated glass.

This object is solved by the laminated glass or window pane of the invention of claim 1. Accordingly, the window pane of the invention which could be used, for instance, in a motor vehicle like a car comprises a first pane and a second pane arranged parallel to the first pane,
  at least one intermediate adhesive layer arranged between the first and second panes for forming a laminate therewith, the intermediate adhesive layer comprising at least one layer opening or recess which is surrounded by an inside opening wall of the intermediate adhesive layer, and
  a reinforcing adhesive material provided in the layer opening or recess of the intermediate adhesive layer and having a higher strength or hardness than the intermediate adhesive layer wherein the reinforcing adhesive material is coplanar to the intermediate adhesive layer.

Due to the higher strength or hardness of the reinforcing adhesive or sticky material in the opening space the flexibility of the adhesive layer between the inner and outer glass panes is advantageously reduced by the invention which results in an increase of the stiffness of the laminated pane or the laminated glass and reduces distortions and shearing affecting the laminated pane or laminated glass.

The panes of the window pane could be, for instance, panes made of glass or polycarbonate (PC). An outer pane could be made of tempered glass and an inner pane could be made of PC. The intermediate adhesive layer could be an adhesive foil of, for instance, PVB, polyurethane (PU), an ionomer, or EVA.

At least two separate accesses can be applied which extend from outside of the window pane to an inside of the layer opening or recess, the first access for supplying liquid reinforcing adhesive material to the layer opening and the second access for venting or evacuating the layer opening to outside of the window pane during supplying liquid reinforcing adhesive material to the layer opening or recess. The accesses allow using a high number of liquid reinforcing materials like glue or resin to be injected into the opening space between the glass panes of the laminate in order to design the appropriate stiffness of the window pane. The access for venting the layer opening or cavity in the intermediate adhesive layer between the inner and outer panes or glass panes can be used as well for mounting the window pane on the vehicle or car. Due to the reinforcing adhesive the opening is reinforced and stiff enough for supporting the holding device of the window pane on the vehicle.

The accesses may be through holes in the first pane and/or the second pane or they may be edge openings in the edge faces of the window pane or one of the accesses can be a through hole in the first pane or in the second pane and the other access can be an edge opening in an edge face of the window.

Preferably, the accesses are through holes in the first pane and/or in the second pane wherein the opening in the intermediate adhesive layer has opposing ends and corresponding opposing end portions or corners, and each of the opposing end portions are provided with one of the through holes. This ensures a complete evacuation or venting of air within the opening of the intermediate adhesive layer or foil during filling of the opening.

In case a sticky liquid as reinforcing material is used, minimum two holes in the inner glass are preferred. The holes can be drilled on one side in the upper corner where the open area space of the PVB is based and on the opposite side, in the lower corner.

Preferably, there are separate upper and lower through holes extending from outside of the window pane to inside of the layer opening, wherein the upper through hole is provided in the inner glass pane for supplying or injecting liquid reinforcing adhesive material to the layer opening. The lower through hole could extend through the inner glass pane, the reinforcing adhesive material, and through the outer glass pane. The lower through hole is provided for venting the layer opening to outside of the window pane during supplying liquid reinforcing adhesive material through the upper through hole into the layer opening, and it could be used for holding and clamping the window pane in the vehicle.

The intermediate adhesive layer can comprise at least two adhesive or functional layers or foils in a laminate. Further, the opening or an access or at least two accesses may be provided in at least one of the laminated adhesive or functional foils of the intermediate adhesive layer or foil.

The invention also refers to a method for production of the laminated glass. Accordingly, the method of the invention for producing a laminated window pane, particularly a laminated safety glass (VSG) for a vehicle like a car, bus, truck and so on comprises:
  providing a first pane and a second pane, an intermediate adhesive layer between the first and second panes, wherein the intermediate adhesive layer has an opening or recess, and providing at least two separated accesses;
  laminating the first pane and the second pane, and the intermediate adhesive layer together wherein the at least two separated accesses are provided between an outside of the laminated window pane and the opening or recess;

afterwards supplying the liquid reinforcing adhesive material through one access into the opening or the recess until it is filled up by the liquid reinforcing adhesive material wherein the opening or recess is vented through the other access during supplying the liquid reinforcing adhesive material; and then curing of the liquid reinforcing adhesive material within the opening or recess to provide a cured and solid reinforcing adhesive material within the opening or recess which has a higher strength or hardness than the intermediate adhesive layer.

After lamination, the sticky liquid is injected through a hole in the glass and the sticky liquid will be spread in the opening space, until the liquid is coming out of the second hole. By filling the open space between the inner and outer glass, the air, which was present before injecting the liquid reinforcing material will be evacuated and replaced by the sticky liquid. This means that, due to a harder physical anchoring by the cured and solid material within the layer opening the friction behavior of the inner and the outer glass is reduced.

The method of the invention for producing a laminated window pane can preferably be applied for providing a laminated safety glass (VSG) for a vehicle like a car, wherein the method comprises the following steps:

providing an outer glass pane and an inner glass pane or polycarbonate (PC) pane as the first and second panes, wherein at least one upper through hole and at least one lower through hole are drilled in the inner glass pane to provide the accesses;

providing an adhesive PVB (Polyvinylbutyral)-foil as the intermediate adhesive layer between the outer and inner glass panes wherein the PVB-foil has an opening or recess; laminating the inner and outer glass panes and the intermediate adhesive PVB-foil together for arranging the opening or recess between the first and second glass panes, wherein the separate lower and upper through holes are provided between the outside of the laminated window pane and the opening or recess;

supplying liquid reinforcing adhesive material like a glue, epoxy, resin, or stiffer PVB through the lower through hole into the opening or the recess wherein the opening or recess is vented through the upper through hole during supplying the liquid reinforcing adhesive material; and Curing of the liquid a glue, epoxy, resin, or stiffer PVB in the opening or recess to provide a layer made of the cured, solid glue, epoxy, resin, or stiffer PVB in the opening space or recess space which has a higher strength or hardness than the intermediate adhesive layer.

Once the sticky liquid has been cured out it will stick the inner and outer glass hard together which reflex in a stiffer laminated glass.

The invention also refers to a method for producing a laminated window pane, particularly a laminated safety glass (VSG) for a vehicle like a car, the method comprising:
providing a first pane and a second pane,
providing an intermediate adhesive layer;
preparing at least one layer opening or recess in the intermediate adhesive layer wherein the layer opening is surrounded or enclosed by an inside opening wall of the intermediate adhesive layer,
arranging the intermediate adhesive layer on one of the first and second panes;
arranging reinforcing adhesive material in the layer opening, the reinforcing adhesive material has a higher strength or hardness than the intermediate adhesive layer; and
laminating together the first pane and the second pane, and the intermediate adhesive layer arranged between the first and second panes and comprising the reinforcing adhesive material in the layer opening.

In case a solid hard sticky material like a foil is used to fix the inner and outer glass plates, the solid sticky material should have the same thickness of the PVB layer or intermediate adhesive layer or PVB or adhesive layers. The solid sticky material will cover the area where the PVB or adhesive layer has been removed. As a normal lamination the intermediate PVB is put on the outer glass, then the sticky solid hard material, for instance, a stiffer PVB-foil is put in the opening space. The inner glass is then arranged on top.

Further advantageous embodiments of the invention are mentioned in the dependent claims. Advantageous embodiments and advantages of the invention could also be derived from the following description of exemplified and preferred embodiments in connection with the drawings:

FIG. 1 a schematic side view of a window pane according to an exemplified and preferred embodiment of the invention;

FIG. 2 a section side view of the window pane according to FIG. 1, seen in the direction of arrow II in FIG. 1;

FIG. 3 a further section side view of the window pane according to FIG. 1, seen in the direction of arrow III in FIG. 1;

FIG. 4 a schematic side view of a window pane according to an exemplified and preferred further embodiment of the invention;

FIG. 5 a side view of the window pane according to FIG. 4, seen in the direction of arrow V in FIG. 1;

FIG. 6 a side view of the window pane according to FIG. 4, seen in the direction of arrow VI in FIG. 4;

FIG. 7 a schematic side view of a window pane according to an exemplified and preferred yet further embodiment of the invention;

FIG. 8 a schematic side view of a window pane according to an exemplified and preferred further embodiment of the invention comprising two adhesive layer openings or spaces;

FIG. 9 a side view of the window pane according to FIG. 8, seen in the direction of arrow IX in FIG. 8; and FIG. 10 a side view of the window pane according to FIG. 8, seen in the direction of arrow X in FIG. 8;

FIG. 11 a schematic side view of a window pane according to an exemplified and preferred further embodiment of the invention comprising through holes and edge openings spaces;

FIG. 12 a side view of the window pane according to FIG. 11, seen in the direction of arrow XII in FIG. 11;

FIG. 13 a side view of the window pane according to FIG. 11, seen in the direction of arrow XIII in FIG. 11; and FIG. 14 a side view of the window pane according to FIG. 11, seen in the direction of arrow XIV in FIG. 11.

FIG. 1 shows a schematic side view of a window pane 1 according to a preferred embodiment of the invention. The window pane 1 may consist of a laminated safety glass (VSG=Verbundsicherheitsglas) and it could be used, for instance, as a moveable side glass of, for instance, a car or other vehicle. The window pane 1 has a transparent outer glass pane 2, directed to an outside of the car, a transparent inner glass pane 3, directed to an inside of the car, and at least one intermediate adhesive layer 4 that may be a PVB (Polyvinylbutyral) foil. The outer and inner glass panes 2 and 3 and the intermediate adhesive layer 4 have the same or almost the same perimeter or shape and they are arranged in parallel to each other, wherein the intermediate adhesive layer 4 is arranged between the outer and inner glass panes 2 and 3 for forming a laminate therewith.

The intermediate adhesive layer 4 is realized by a PVB-foil and comprises a layer opening 7 that is surrounded by an inside opening wall 4.1 of the intermediate adhesive layer 4. Opposing upper and lower parts 4.2 and 4.4 and two opposing side parts 4.3 and 4.5 of the PVB-foil of the intermediate adhesive layer 4 surround or enclose the layer opening 7 on all sides. A reinforcing adhesive material 8 is provided in the layer opening 7 which shows a higher strength, hardness and/or stiffness than the PVB-foil of the intermediate adhesive layer 4 when the reinforcing adhesive material 8 is cured and solid. The reinforcing adhesive material 8 is coplanar to the intermediate adhesive layer 4 and it has the same thickness as the intermediate adhesive layer 4. The reinforcing adhesive material 8 may be provided outside of a viewable area of the window pane 1. The reinforcing adhesive material 8 may be glue, a resin, an epoxy, a PVB that is stiffer and firmer than the PVB-foil of the intermediate adhesive layer 4. Generally, the reinforcing adhesive material 8 can be transparent.

According to FIGS. 2 and 3, there are two separate upper and lower through holes 6 and 5 drilled in the inner glass pane 3 which are accesses extending from an outside of the window pane 1 to an inside of the layer opening 7. The upper through hole 6 is provided for supplying or injecting liquid reinforcing adhesive material 8 to the layer opening 7 and the lower through hole 5 is provided for venting the layer opening 7 to the outside of the window pane 1 during supplying liquid reinforcing adhesive material 8 to the layer opening 7. The layer opening 7 of the intermediate adhesive layer 4 has opposing end portions 7.1 and 7.2 wherein the end portion 7.1 has a lower corner 7.3 and the other end portion 7.2 has an upper corner 7.4 of the inside opening wall 4.1. The upper through hole 6 is provided in the upper corner 7.4 and the lower through hole 5 is provided in the lower corner 7.3. The upper and lower through holes 6 and 5 are filled up with the reinforcing adhesive material 8. In alternative, the upper through hole could be used for venting of the layer opening and the lower through hole could be used for injecting the liquid reinforcing adhesive material to the layer opening in the intermediate adhesive layer.

The method for providing the window pane 1, particularly the laminated safety glass (VSG) for a vehicle like a car, comprises the step of providing the outer glass pane 2 and the inner glass pane 3 wherein the upper through hole 6 and the lower through hole 5 are drilled in the inner glass pane 3 to provide the accesses.

In a further step, the adhesive PVB (Polyvinylbutyral)-foil as the intermediate adhesive layer 4 is provided between the outer and inner glass panes 2 and 3 wherein the PVB-foil has a layer opening 7 that has been cut out of the PVB-foil of the intermediate adhesive layer 4.

Next, the inner and outer glass panes 2 and 3 and the intermediate adhesive layer 4 or PVB-foil are laminated together for arranging the layer opening 7 between the outer and inner glass panes 2 and 3, wherein the separate lower and upper through holes 5 and 6 are provided between the outside of the laminated window pane 1 and the layer opening 7. The lamination can be carried out in an autoclave.

In the next step, liquid reinforcing adhesive material 8 like glue, epoxy, resin, or stiffer PVB is supplied or injected through the upper through hole 6 into the layer opening 7 wherein air in the layer opening 7 is vented through the lower through hole 5 to the outside of the window pane 1 during supplying the liquid reinforcing adhesive material 8. The upper and lower through holes 6 and 5 are also filled up with the liquid reinforcing adhesive material 8. In alternative, the upper through hole could be used for venting of the layer opening and the lower through hole could be used for injecting the liquid reinforcing adhesive material to the layer opening in the intermediate adhesive layer.

Afterwards the liquid reinforcing adhesive material 8, for instance, the glue, epoxy, resin, or stiffer PVB or other sticky material, in the layer opening 7 is cured to provide the cured, solid glue, epoxy, resin, or stiffer PVB in the layer opening 7 and the upper and lower through holes 6 and 5 which has a higher strength or hardness than the surrounding intermediate adhesive layer 4 or PVB-foil.

FIG. 4 shows schematic side view of a further window pane 1.1 according to a further preferred embodiment of the invention. The window pane 1.1 could again consist of a laminated safety glass (VSG=Verbundsicherheitsglas) and it could be used, for instance, as a moveable side glass of a car. The window pane 1.1 has a transparent outer glass pane 2.1, directed to an outside of the car, a transparent inner glass pane 3.1, directed to an inside of the car, and at least one intermediate adhesive layer 4.12 that may be a PVB (Polyvinylbutyral) foil. The outer and inner glass panes 2.1 and 3.1 and the intermediate adhesive layer 4.12 have the same or almost the same perimeter and they are arranged in parallel to each other, wherein the intermediate adhesive layer 4.12 is arranged between the outer and inner glass panes 2.1 and 3.1 for forming a laminate therewith.

The intermediate adhesive layer 4.12 is realized by a PVB-foil and comprises a layer opening 7.11 that is surrounded by an inside opening wall 4.11 of the intermediate adhesive layer 4.12. Opposing upper and lower parts 4.21 and 4.41 and two opposing side parts 4.31 and 4.51 of the PVB-foil of the intermediate adhesive layer 4.12 surround or enclose the layer opening 7.11 on all sides.

A reinforcing adhesive material 8.1 is provided in the layer opening 7.11 which shows a higher strength, hardness and/or stiffness than the PVB-foil of the intermediate adhesive layer 4.12 when the reinforcing adhesive material 8.1 is cured and solid. The reinforcing adhesive material 8.1 is coplanar to the intermediate adhesive layer 4.12 and it has the same thickness as the intermediate adhesive layer 4.12. The reinforcing adhesive material 8.1 may be provided outside of a viewable area of the window pane 1.1. The reinforcing adhesive material 8.1 may be again glue, a resin, an epoxy, a PVB that is stiffer and firmer than the PVB-foil of the intermediate adhesive layer 4.12.

According to FIGS. 5 and 6, there are two separate upper and lower edge openings 5.1 and 6.1 cut out of the intermediate adhesive layer 4.12 or PVB-foil which are accesses extending from an outside of the window pane 1.1 at an edge face 4.13 of the intermediate adhesive layer 4.12 or the window pane 1.1 to an inside of the layer opening 7.11. The upper edge opening 6.1 is provided for supplying liquid reinforcing adhesive material 8.1 to the layer opening 7.11 and the lower edge opening 5.1 is provided for venting the layer opening 7.11 to the outside of the window pane 1.1 during supplying liquid reinforcing adhesive material 8.1 to the layer opening 7.11. The layer opening 7.11 of the intermediate adhesive layer 4.12 has opposing end portions 7.13 and 7.12 wherein the end portion 7.12 has a lower portion 7.31 and the other end portion 7.13 has an upper portion 7.41. The upper edge opening 6.1 is provided in the upper portion 7.41 and the lower edge opening 5.1 is provided in the lower portion 7.31. The upper and lower edge openings 5.1 and 6.1 are filled up with the reinforcing adhesive material 8.1.

The method for providing the window pane 1.1, particularly the laminated safety glass (VSG) for a vehicle like a car, comprises the step of providing the outer glass pane 2.1 and the inner glass pane 3.1.

In a further step, the adhesive PVB (Polyvinylbutyral)-foil as the intermediate adhesive layer 4.11 is provided between the outer and inner glass panes 2.1 and 3.1.

The intermediate adhesive layer 4.12 or the PVB-foil has a layer opening 7.11 that has been cut out of the PVB-foil of the intermediate adhesive layer 4.11. Further, the upper edge opening 6.1 and the lower edge opening 5.1 are cut out of intermediate adhesive layer 4.11 or PVB-foil to provide the two accesses.

Next, the inner and outer glass panes 2.1 and 3.1 and the intermediate adhesive layer 4.11 or PVB-foil are laminated together for arranging the layer opening 7.11 and the upper edge opening 6.1 and the lower edge opening 5.1 between the outer and inner glass panes 2.1 and 3.1. The lamination can be carried out in an autoclave.

In the next step, liquid reinforcing adhesive material 8.1 like glue, epoxy, resin, or stiffer PVB is supplied or injected through the upper edge opening 6.1 into the layer opening 7.11 wherein air in the layer opening 7.11 is vented through the lower edge opening 5.1 to the outside of the window pane 1.1 during supplying the liquid reinforcing adhesive material 8.1. The upper and lower edge openings 5.1 and 6.1 are also filled up with the liquid reinforcing adhesive material 8.1.

Afterwards, the liquid reinforcing adhesive material 8.1, for instance, the glue, epoxy, resin, or stiffer PVB or other sticky material, in the layer opening 7.11 and in the upper and lower edge openings 6.1 and 5.1 is cured to provide the cured, solid glue, epoxy, resin, or stiffer PVB in the layer opening 7.11 which has a higher strength or hardness than the surrounding intermediate adhesive layer 4.11 or PVB-foil.

FIG. 7 shows a schematic side view of a yet further window pane 1.2 according to a further preferred embodiment of the invention. The window pane 1.2 may again consist of a laminated safety glass (VSG=Verbundsicherheitsglas) and it could be used, for instance, as a moveable side glass of a car. The window pane 1.2 has a transparent outer glass pane 2.2, directed to an outside of the car, a transparent inner glass pane 3.2, directed to an inside of the car, and at least one intermediate adhesive layer 4.2 that may be a PVB (Polyvinylbutyral) foil. The outer and inner glass panes 2.2 and 3.3 and the intermediate adhesive layer 4.2 have the same or almost the same perimeter and they are arranged in parallel to each other, wherein the intermediate adhesive layer 4.2 is arranged between the outer and inner glass panes 2.2 and 3.2 for forming a laminate therewith.

The intermediate adhesive layer 4.2 is realized by a PVB-foil and comprises a layer opening 7.2 that is surrounded by an inside opening wall 4.24 of the intermediate adhesive layer 4.2. Opposing upper and lower parts 4.22 and 4.42 and two opposing side parts 4.32 and 4.52 of the PVB-foil of the intermediate adhesive layer 4.2 surround or enclose the layer opening 7.2 on all sides without any accesses or interruptions.

A solid reinforcing adhesive material 8.2 is arranged in the layer opening 7.2 which shows a higher strength, hardness and/or stiffness than the PVB-foil of the intermediate adhesive layer 4.2. The reinforcing adhesive material 8.2 is coplanar to the intermediate adhesive layer 4.2 and it has the same thickness as the intermediate adhesive layer 4.2. The reinforcing adhesive material 8.2 may be a further PVB-foil that is stiffer and firmer than the PVB-foil of the intermediate adhesive layer 4.2.

The method for providing the window pane 1.2, particularly the laminated safety glass (VSG) for a vehicle like a car, comprises the step of providing the outer glass pane 2.2 and the inner glass pane 3.2.

In a further step, the adhesive PVB (Polyvinylbutyral)-foil of the intermediate adhesive layer 4.2 is provided. The intermediate adhesive layer 4.2 or the PVB-foil has the layer opening 7.2 that has been cut out of the PVB-foil of the intermediate adhesive layer 4.2.

Next, the inner and outer glass panes 2.2 and 3.2 and the cut out intermediate adhesive layer 4.2 or PVB-foil are laminated together for arranging the PVB-foil of the intermediate adhesive layer 8.2 with the layer opening 7.2 between the outer and inner glass panes 2.2 and 3.2. The lamination can be carried out in an autoclave to produce the laminated window pane 1.2.

FIG. 8 shows a schematic side view of a window pane 1.3 according to a preferred embodiment of the invention. The window pane 1.3 could consist of a laminated safety glass (VSG=Verbundsicherheitsglas) and it could be used, for instance, as a moveable side glass of a car or vehicle. The window pane 1.3 has a transparent outer glass pane 2.3, a transparent inner glass pane 3.3, directed to an inside of the car, and at least one intermediate adhesive layer 4.3 that could be a PVB (Polyvinylbutyral) foil. The outer and inner glass panes 2.3 and 3.3 and the intermediate adhesive layer 4.3 have the same or almost the same perimeter and shape and they are arranged in parallel to each other, wherein the intermediate adhesive layer 4.3 is arranged between the outer and inner glass panes 2.3 and 3.3 for forming a laminate therewith.

The intermediate adhesive layer 4.3 comprises a first layer opening 7.31 that is surrounded by an inside opening wall 4.131 of the intermediate adhesive layer 4.3. Further, the intermediate adhesive layer 4.3 comprises a second layer opening 7.32 that is surrounded by an inside opening wall 4.132 of the intermediate adhesive layer 4.3. Opposing upper and lower parts 4.23 and 4.43, two opposing side parts 4.33 and 4.53, and one middle part 4.63 of the PVB-foil of the intermediate adhesive layer 4.3 surround or enclose together the layer openings 7.31 and 7.32, wherein the middle part 4.63 extends between the layer openings 7.31 and 7.32 or spaces.

A reinforcing adhesive material 8.3 is provided in the layer openings 7.31 and 7.32 which shows a higher strength, hardness and/or stiffness than the PVB-foil of the intermediate adhesive layer 4.3 when the reinforcing adhesive material 8.3 is cured and solid. The reinforcing adhesive material 8.3 is coplanar to the intermediate adhesive layer 4.3 and it has the same thickness as the intermediate adhesive layer 4.3. The reinforcing adhesive material 8.3 may be provided outside of a viewable area of the window pane 1.3. The reinforcing adhesive material 8.3 may be glue, a resin, an epoxy, a PVB that is stiffer and firmer than the PVB-foil of the intermediate adhesive layer 4.3.

According to FIGS. 9 and 10, there are two separate upper and lower through holes 5.31 and 6.31 extending from outside of the window pane 1.3 to inside of the first layer opening 7.31. The upper through hole 5.31 is drilled in the inner glass pane 3.3 and it is provided for supplying or injecting liquid reinforcing adhesive material 8.3 to the first layer opening 7.31. The lower through hole 6.31 is drilled and it extends through the inner glass pane 3.3, the reinforcing adhesive material 8.3, and through the outer glass pane 2.3. The lower through hole 6.31 is provided for venting the first layer opening 7.31 to the outside of the window pane 1.3 during supplying liquid reinforcing adhesive material 8.3 through the upper through hole 5.31 into the first layer opening 7.31.

The layer opening 7.31 of the intermediate adhesive layer 4.3 has opposing end portions 7.13 and 7.23 wherein the end portion 7.13 has a lower corner 7.14 adjoining the lower part 4.43 and the side part 4.33 of the PVB-foil of the intermediate adhesive layer 4.3. The opposing end portion 7.23 has an upper corner 7.24 adjoining the upper part 4.23 and the middle part 4.63 of the PVB-foil of the intermediate adhesive layer 4.3. Accordingly, the upper through hole 5.31 is provided in the upper corner 7.24 and the lower through hole 6.31 is provided in the lower corner 7.14. The upper through hole 5.31 is filled up with the reinforcing adhesive material 8.3.

According to FIGS. 9 and 10, there is a further pair of upper and lower through holes 5.32 and 6.32 extending from outside of the window pane 1.3 to inside or space of the second layer opening 7.32. The upper through hole 5.32 is drilled in the inner glass pane 3.3 and it is provided for supplying or injecting liquid reinforcing adhesive material 8.3 to the second layer opening 7.32. The lower through hole 6.32 is drilled and it extends through the inner glass pane 3.3, the reinforcing adhesive material 8.3, and through the outer glass pane 2.3. The lower through hole 6.32 is provided for venting the second layer opening 7.32 to the outside of the window pane 1.3 during supplying liquid reinforcing adhesive material 8.3 through the upper through hole 5.32 into the second layer opening 7.32.

The layer opening 7.32 of the intermediate adhesive layer 4.3 has opposing end portions 7.24 and 7.25 wherein the end portion 7.24 has a lower corner 7.26 adjoining the lower part 4.43 and the side part 4.33 of the PVB-foil of the intermediate adhesive layer 4.3. The opposing end portion 7.25 has an upper corner 7.27 adjoining the upper part 4.23 and the side part 4.63 of the PVB-foil of the intermediate adhesive layer 4.3. Accordingly, the upper through hole 5.32 is provided in the upper corner 7.27 and the lower through hole 6.32 is provided in the lower corner 7.26. The upper through hole 5.32 is filled up with the reinforcing adhesive material 8.3.

The method for providing the window pane 1.3, particularly the laminated safety glass (VSG) for a vehicle like a car, comprises the step of providing the outer glass pane 2.3 and the inner glass pane 3.3 wherein the upper through holes 5.31 and 5.32 are drilled in the inner glass pane 3.3 and the lower through holes 6.31 and 6.32 are drilled in the inner and outer glass panes 3.3 and 2.3 to provide the accesses to the layer opening 7.31 and 7.32, respectively.

In a further step, the adhesive PVB (Polyvinylbutyral)-foil as the intermediate adhesive layer 4.3 is provided between the outer and inner glass panes 2.3 and 3.3 wherein the PVB-foil has the pair of separated layer openings 7.31 and 7.32 of same size and shape which have been cut out of the PVB-foil of the intermediate adhesive layer 4.3.

Next, the inner and outer glass panes 2.3 and 3.3 and the intermediate adhesive PVB-foil 4.3 are laminated together for arranging the layer openings 7.31 and 7.32 between the outer and inner glass panes 2.3 and 3.3, wherein the first pair of the separate upper and lower through holes 5.31 and 6.31 and also the second pair of the separate upper and lower through holes 5.32 and 6.32 are provided between the outside of the laminated window pane 1.3 and the layer openings 7.31 and 7.32, respectively. The lamination can be carried out in an autoclave.

In the next step, liquid reinforcing adhesive material 8.3 like glue, epoxy, resin, or stiffer PVB is supplied or injected through the upper through holes 5.31 and 5.32 into the layer openings 7.31 and 7.32, respectively, wherein air in the layer openings 7.31 and 7.32 is vented through the lower through holes 6.31 and 6.32, respectively, to outside of the window pane 1.3 during supplying the liquid reinforcing adhesive material 8.3. The upper through holes 5.31 and 5.32 are also filled up with the liquid reinforcing adhesive material 8.3.

Afterwards, it could be required to clean or drill the lower through holes 6.31 and 6.32 again to remove any reinforcing adhesive material 8.3 injected into the lower through holes 6.31 and 6.32.

Afterwards, the liquid reinforcing adhesive material 8.3, for instance, the glue, epoxy, resin, or stiffer PVB or other sticky material, in the layer openings 7.31 and 7.32 and in the upper through holes 5.31 and 5.32 is cured to provide the cured, solid reinforcing material 8.3, for instance, glue, epoxy, resin, or stiffer PVB in the layer openings 7.31 and 7.32 and in the upper and lower through holes 5.31 and 5.32 and 6.31 and 6.32. The cured, solid reinforcing adhesive material 8.3 has a higher strength or hardness than the surrounding intermediate adhesive layer 4.3 or PVB-foil. Afterwards, it could be required to clean or drill the lower through holes 6.31 and 6.32 again to remove any reinforcing adhesive material 8.3 thereof which was injected into the lower through holes 6.31 and 6.32. The lower through holes 6.31 and 6.32 then could be used as clamp holes for holding and mounting the window pane 1.3 in a door or frame of the vehicle.

FIG. 11 shows schematic side view of a further window pane 1.49 according to a further preferred embodiment of the invention. The window pane 1.49 could again consist of a laminated safety glass (VSG=Verbundsicherheitsglas) and it could be used, for instance, as a moveable side glass of a car. The window pane 1.49 has a transparent outer glass pane 2.49, directed to an outside of the car, a transparent inner glass pane 3.49, directed to an inside of the car, and at least one intermediate adhesive layer 4.49 that may be a PVB (Polyvinylbutyral) foil. The outer and inner glass panes 2.49 and 3.49 and the intermediate adhesive layer 4.49 have the same or almost the same perimeter and they are arranged in parallel to each other, wherein the intermediate adhesive layer 4.49 is arranged between the outer and inner glass panes 2.49 and 3.49 for forming a laminate therewith.

The intermediate adhesive layer 4.49 is realized by a PVB-foil and comprises a layer opening 7.49 that is surrounded by an inside opening wall 4.419 of the intermediate adhesive layer 4.49. Opposing upper and lower parts 4.429 and 4.439 of the PVB-foil of the intermediate adhesive layer 4.49 surround or enclose the layer opening 7.49 on all sides.

A reinforcing adhesive material 8.49 is provided in the layer opening 7.49 which shows a higher strength, hardness and/or stiffness than the PVB-foil of the intermediate adhesive layer 4.49 when the reinforcing adhesive material 8.49 is cured and solid. The reinforcing adhesive material 8.49 is coplanar to the intermediate adhesive layer 4.49 and it has the same thickness as the intermediate adhesive layer 4.49. The reinforcing adhesive material 8.49 may be provided outside of a viewable area of the window pane 1.49. The reinforcing adhesive material 8.49 may be again glue, a resin, an epoxy, a PVB that is stiffer and firmer than the PVB-foil of the intermediate adhesive layer 4.49.

According to FIGS. 12, 13 and 14, there are two separate edge openings 5.49 and 6.49 cut out of the intermediate adhesive layer 4.49 or PVB-foil which are accesses extending from an outside of the window pane 1.49 at an lower edge face 4.439 of the intermediate adhesive layer 4.49 or of the window pane 1.49 to an inside of the layer opening 7.49. The edge opening 6.49 (or 5.49) is provided for supplying liquid reinforcing adhesive material 8.49 to the layer opening 7.49 and the edge opening 5.49 (or 6.49) is provided for venting the layer opening 7.49 to the outside of the window pane 1.49 during supplying liquid reinforcing adhesive material 8.49 to the layer opening 7.49. The layer opening 7.49 of the intermediate adhesive layer 4.49 has opposing parallel end portions 7.429 and 7.439 that are accessible via the edge openings 5.49 and 6.49, respectively. A middle portion 7.449 of the layer opening 7.49 is provided between the opposing end portions 7.429 and 7.439 and connects them to provide a u-shape of the layer opening 7.49 in the intermediate layer 4.49. The middle portion 7.449, the opposing end portions 7.429 and 7.439, and the edge openings 5.49 and 6.49 show substantially the same cross sectional area. The opposing end portions 7.429 and 7.439, the middle portion 7.449 of the layer opening 7.49, and the edge openings 5.49 and 6.49 are filled up with the reinforcing adhesive material 8.49.

According to FIGS. 12, 13 and 14, there is a pair of through holes 5.429 and 5.439 extending from an outside of the window pane 1.49 to an inside or space of the second layer opening 7.49. The through holes 5.429 and 5.439 are drilled in the inner glass pane 3.49 and in the outer glass pane 2.49 and they are extending through the whole window pane 1.49 from its inside to its outside.

The method for providing the window pane 1.49, particularly the laminated safety glass (VSG) for a vehicle like a car, comprises the step of providing the outer glass pane 2.49 and the inner glass pane 3.49. The through holes 5.429 and 5.439 are drilled extending through the inner glass pane 3.49 and the outer glass pane 2.49. The through holes 5.429 and 5.439 are drilled in-line after cutting and grinding the glass panes 3.49 and 2.49. This means that the through holes 5.429 and 5.439 are produced before assembling and lamination of the window pane 1.49.

In a further step, the adhesive PVB (Polyvinylbutyral)-foil as the intermediate adhesive layer 4.49 is provided between the outer and inner glass panes 2.49 and 3.49.

The intermediate adhesive layer 4.49 or the PVB-foil has a layer opening 7.49 that has been cut out of the PVB-foil of the intermediate adhesive layer 4.49. Further, the edge opening 6.49 and the edge opening 5.49 are cut out of intermediate adhesive layer 4.49 or PVB-foil to provide the two accesses.

Next, the inner and outer glass panes 2.49 and 3.49 and the intermediate adhesive layer 4.49 or PVB-foil are laminated together for arranging the layer opening 7.49 and the edge openings 6.49 and 5.49 between the outer and inner glass panes 2.49 and 3.49. The lamination can be carried out in an autoclave. The through holes 5.429 and 5.439 extend through the inner glass pane 3.49, the end portions 7.429 and 7.439, respectively, and through the outer glass pane 2.49.

In the next step, liquid reinforcing adhesive material 8.49 like glue, epoxy, resin, or stiffer PVB is supplied or injected through the edge opening 6.49 or 5.49 into the layer opening 7.49 wherein air in the layer opening 7.49 is vented through the edge opening 5.49 or 6.49, respectively, to the outside of the window pane 1.49 during supplying the liquid reinforcing adhesive material 8.49. The complete layer opening 7.49, the edge openings 6.49 and 5.49 and also the through holes 5.429 and 5.439 are also filled up with the liquid reinforcing adhesive material 8.49.

Afterwards, the liquid reinforcing adhesive material 8.49, for instance, the glue, epoxy, resin, or stiffer PVB or other sticky material, in the layer opening 7.49, in the edge openings 6.49 or 5.49, and in the through holes 5.429 and 5.439 is cured to provide the cured, solid reinforcing material 8.49, for instance, glue, epoxy, resin, or stiffer PVB in the layer opening 7.49, the edge openings 6.49 and 5.49, and the through holes 5.429 and 5.439. The cured, solid reinforcing adhesive material 8.49 has a higher strength or hardness than the surrounding intermediate adhesive layer 4.49 or PVB-foil. The cured reinforcing material 8.49 then shows the u-shape of the layer opening 7.49

In the next step, it could be required to clean or drill the through holes 5.429 and 5.439 including drilling through the reinforcing adhesive material 8.49 in the layer opening 7.49 again to remove any reinforcing adhesive material 8.49 which was injected into the through holes 5.429 or 5.439. The through holes 5.429 and 5.439 then could be used as clamp holes for holding and mounting the window pane 1.49 in a door or frame of the vehicle.

The invention claimed is:

1. A window pane for a motor vehicle, the window pane comprising:
    a first pane and a second pane arranged parallel to the first pane;
    an intermediate adhesive layer arranged between the first pane and the second pane and forming a laminate therewith, the intermediate adhesive layer comprising a layer opening or recess surrounded by an inside opening wall of the intermediate adhesive layer;
    a reinforcing adhesive material in the layer opening or recess of the intermediate adhesive layer and having a higher strength or hardness than the intermediate adhesive layer, wherein the reinforcing adhesive material is coplanar to the intermediate adhesive layer; and
    at least two separate accesses extending from an outside of the window pane to an inside of the layer opening or recess,
    wherein
    a first access of the at least two accesses is configured to supply the reinforcing adhesive material in liquid form to the layer opening or recess,
    a second access of the at least two accesses is configured to vent the layer opening or recess to the outside of the window pane during supplying of the reinforcing adhesive material in the liquid form to the layer opening or recess,
    at least one of the accesses comprises a through hole in at least one of the first pane or the second pane,
    the layer opening or recess in the intermediate adhesive layer has opposing ends and corresponding opposing end portions, and each of the opposing end portions includes a through hole,
    separate upper and lower through holes extend from the outside of the window pane to the inside of the layer opening or recess,
    one through hole is an upper through hole and another one through hole is a lower through hole,
    the upper through hole is in an upper corner or near an upper portion of the inside opening wall of the opening or recess,
    the lower through hole is in a lower corner or near a lower portion of the inside opening wall of the layer opening, and one of the first and second panes is an outer glass pane, and the other of the first and second panes is an inner glass pane, the upper through hole is provided in the inner glass pane for supplying the reinforcing adhesive material in the liquid form to the layer opening or recess, and the lower through hole extends through the inner glass pane, the reinforcing adhesive material, and through the outer glass pane, wherein the lower through hole is provided for venting the layer opening or recess to the outside of the window pane during supplying of the reinforcing adhesive material in the liquid form through the upper through hole into the layer opening or recess, and for holding and clamping the window pane in the vehicle.

2. The window pane according to claim 1, wherein at least one of the accesses is filled up with the reinforcing adhesive material.

3. The window pane according to claim 1, wherein the reinforcing adhesive material is provided outside of a viewable area of the window pane.

4. The window pane according to claim 1, wherein at least one of the accesses comprises an edge opening in an edge face of the window pane, and the opposing end portions include the edge opening.

5. The window pane according to claim 1, further comprising separate upper and lower edge openings extending from the outside of the window pane to the inside of the layer opening or recess, and one edge opening is an upper edge opening and another one edge opening is a lower edge opening, the upper edge opening is in an upper corner or near an upper portion of the inside opening wall of the opening or recess, and the lower edge opening is in a lower corner or near a lower portion of the inside opening wall of the layer opening.

6. A method of producing a laminated window pane according to claim 1, the method comprising:
providing the first pane and the second pane, and the intermediate adhesive layer between the first pane and the second pane, wherein the intermediate adhesive layer has the layer opening or recess;
preparing the at least two separated accesses between the outside of the window pane and the inside of the layer opening or recess;
laminating the first pane, the second pane, and the intermediate adhesive layer together;
then supplying the reinforcing adhesive material in the liquid form through the first access into the layer opening or the recess until the layer opening or recess is filled up by the reinforcing adhesive material in the liquid form, wherein the layer opening or recess is vented through the second access during the supplying of the reinforcing adhesive material in the liquid form; and
then curing the reinforcing adhesive material within the layer opening or recess to provide a cured and solid reinforcing adhesive material within the layer opening or recess having a higher strength or hardness than the intermediate adhesive layer.

7. The method according to claim 6, further comprising:
drilling at least one or two through holes in at least one of the first pane or the second pane for providing the accesses to the layer opening or recess before the laminating.

8. The method according to claim 6, further comprising:
cutting out the layer opening or the recess from the intermediate adhesive layer.

9. The method according to claim 6, further comprising:
cutting out at least one of the at least two accesses from the intermediate adhesive layer.

10. The method according to claim 6, the method comprising:
providing an outer glass pane and an inner glass pane as the first and second panes, respectively;
drilling an upper through hole and a lower through hole in at least one of the inner glass pane or the outer glass pane to provide the accesses;
providing an adhesive PVB (Polyvinylbutyral)-foil as the intermediate adhesive layer between the outer glass pane and the inner glass pane, wherein the PVB-foil has the layer opening or recess;
laminating the inner glass pane, the outer glass pane and the intermediate adhesive PVB-foil together for arranging the layer opening or recess between the outer and inner glass panes, wherein the lower and upper through holes are provided between the outside of the laminated window pane and the layer opening or recess;
supplying the reinforcing adhesive material in the liquid form and comprising a glue, epoxy, resin, or stiffer PVB through the lower through hole or the upper through hole into the layer opening or the recess, wherein the layer opening or recess is vented through the upper through hole or the lower through hole during the supplying of the reinforcing adhesive material in the liquid form; and
curing of the reinforcing adhesive material in the layer opening or recess to provide the cured, solid reinforcing adhesive material in the layer opening or recess which has a higher strength or hardness than the surrounding intermediate adhesive layer.

11. A window pane for a motor vehicle, the window pane comprising:
a first pane and a second pane arranged parallel to the first pane;
an intermediate adhesive layer arranged between the first pane and the second pane and forming a laminate therewith, the intermediate adhesive layer comprising a layer opening or recess surrounded by an inside opening wall of the intermediate adhesive layer;
a reinforcing adhesive material in the layer opening or recess of the intermediate adhesive layer and having a higher strength or hardness than the intermediate adhesive layer, wherein the reinforcing adhesive material is coplanar to the intermediate adhesive layer; and
at least two separate accesses extending from an outside of the window pane to an inside of the layer opening or recess,
wherein
the accesses comprise an upper access, and a lower access,
each of the upper access and the lower access comprises a through hole in at least one of the first pane or the second pane,
the layer opening or recess in the intermediate adhesive layer has opposing end portions, one of the opposing end portions includes the upper access, and the other of the opposing end portions includes the lower access,
the upper access is in an upper corner or near an upper portion of the inside opening wall,
the lower access is in a lower corner or near a lower portion of the inside opening wall,
one of the upper access and the lower access is configured to supply the reinforcing adhesive material in liquid form to the layer opening or recess, the other of the upper access and the lower access is configured to vent the layer opening or recess to the outside of the window pane during supplying of the reinforcing adhesive material in the liquid form to the layer opening or recess, one of the first and second panes is an outer glass pane, and the other of the first and second panes is an inner glass pane, the upper access comprises an upper through hole in the inner glass pane for supplying the reinforcing adhesive material in the liquid form to the layer opening or recess, and the lower access comprises a lower through hole that extends through the inner glass pane, the reinforcing adhesive material, and through the outer glass pane, wherein the lower through hole is provided for venting the layer opening or recess to the outside of the window pane during supplying of the reinforcing adhesive material in the liquid form through the upper through hole into the layer opening or recess, and for holding and clamping the window pane in the vehicle.

12. The window pane according to claim 11, wherein at least one of the accesses is filled up with the reinforcing adhesive material.

13. The window pane according to claim 12, wherein the reinforcing adhesive material is provided outside of a viewable area of the window pane.

* * * * *